(12) United States Patent
Warren

(10) Patent No.: US 8,139,028 B2
(45) Date of Patent: Mar. 20, 2012

(54) PROXIMITY SENSOR AND METHOD FOR INDICATING EXTENDED INTERFACE RESULTS

(75) Inventor: Andrew I. Warren, San Jose, CA (US)

(73) Assignee: Synaptics Incorporated, Santa Clara, CA (US)

(*) Notice: Subject to any disclaimer, the term of this patent is extended or adjusted under 35 U.S.C. 154(b) by 1247 days.

(21) Appl. No.: 11/613,063

(22) Filed: Dec. 19, 2006

(65) Prior Publication Data

US 2007/0176906 A1 Aug. 2, 2007

Related U.S. Application Data

(60) Provisional application No. 60/764,406, filed on Feb. 1, 2006.

(51) Int. Cl.
*G06F 3/033* (2006.01)
(52) U.S. Cl. .......................... 345/157; 345/173; 715/863
(58) Field of Classification Search .................. 345/157, 345/173; 715/863
See application file for complete search history.

(56) References Cited

U.S. PATENT DOCUMENTS

| | | | | |
|---|---|---|---|---|
| 5,128,672 | A | | 7/1992 | Kaehler |
| 5,543,591 | A | * | 8/1996 | Gillespie et al. ............ 178/18.03 |
| 5,757,368 | A | * | 5/1998 | Gerpheide et al. ............ 715/769 |
| 5,825,352 | A | * | 10/1998 | Bisset et al. .................. 345/173 |
| 5,856,822 | A | * | 1/1999 | Du et al. ......................... 345/73 |
| 5,889,236 | A | * | 3/1999 | Gillespie et al. ............ 178/18.01 |
| 6,037,882 | A | | 3/2000 | Levy |
| 6,380,931 | B1 | * | 4/2002 | Gillespie et al. .............. 345/173 |
| 2003/0210286 | A1 | * | 11/2003 | Gerpheide et al. ............ 345/863 |
| 2008/0036743 | A1 | * | 2/2008 | Westerman et al. .......... 345/173 |

OTHER PUBLICATIONS

FingerWorks, Inc., "FingerWorks Installation and Operation Guide for iGesture Products w/Keys" (submitted by Applicant), FingerWorks, Inc., 2002, 10 pgs., http://www.fingerworks.com (submitted by Applicant).*
"FingerWorks Installation and Operation Guide for iGesture Products w/Keys," FingerWorks, Inc., 2002, 10 pgs., http://www.fingerworks.com.
"Quick Reference Guide for iGesture Products," FingerWorks, Inc., 1999-2002, 2 pgs., http://www.fingerworks.com.
"iGesture Pad Installation and Operation," FingerWorks, Inc., 2 pgs., publication date 2002.
"Right Hand Gesture/Hotkey Mappings for all TouchStream and iGesture Products," FingerWorks, Inc., 2002, 1 pg., http://www.fingerworks.com.
"Tips and Tricks for using the MultiTouch Surface," FingerWorks, Inc., 1999-2000, 1 pg., http://www.fingerworks.com.
FingerWorks Installation and Operation Guide for the TouchStream ST & TouchStream LP, FingerWorks, Inc., 2002, 14 pgs., http://www.fingerworks.com.
"Quick Reference Guide for TouchStream ST/LP," FingerWorks, Inc., 1999-2002, http://www.fingerworks.com.

* cited by examiner

*Primary Examiner* — Richard Hjerpe
*Assistant Examiner* — Dorothy Harris
(74) *Attorney, Agent, or Firm* — Ingrassia Fisher & Lorenz, P.C.

(57) ABSTRACT

A proximity sensor device and method is provided that facilitates improved system usability. Specifically, the proximity sensor device and method provide a user with the ability to easily cause different results in an electronic system using a proximity sensor device as a user interface. For example, it can be used to facilitate user interface navigation, such as dragging and scrolling. As another example, it can be used to facilitate value adjustments, such as changing a device parameter. In general, the proximity sensor device is adapted to distinguish between different object combination motions, determine relative temporal relationships between those motions, and generate user interface results responsive to the motions. This allows a user to selectively generate different results using the motion of two different object combinations.

22 Claims, 7 Drawing Sheets

PROXIMITY SENSOR AND METHOD FOR INDICATING EXTENDED INTERFACE RESULTS

PRIORITY DATA

This application claims priority of U.S. Provisional Patent Application Ser. No. 60/764,406, filed on Feb. 1, 2006, which is hereby incorporated herein by reference.

FIELD OF THE INVENTION

This invention generally relates to electronic devices, and more specifically relates to proximity sensor devices and using a touch sensor device for producing user interface inputs.

BACKGROUND OF THE INVENTION

Proximity sensor devices (also commonly called touch pads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), can be used to provide an input to the electronic system. For example, proximity sensor devices are used as input devices for larger computing systems, such as those found integral within notebook computers or peripheral to desktop computers. Proximity sensor devices are also used in smaller systems, including: handheld systems such as personal digital assistants (PDAs), remote controls, communication systems such as wireless telephones and text messaging systems. Increasingly, proximity sensor devices are used in media systems, such as CD, DVD, MP3, video or other media recorders or players.

Many electronic devices include a user interface, or UI, and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device can function as a value adjustment device, cursor control device, selection device, scrolling device, graphics/character/handwriting input device, menu navigation device, gaming input device, button input device, keyboard and/or other input device.

One issue with past touch sensor devices has been enabling dragging, scrolling, and similar functions with gestures. Specifically, many users cite difficulty in using touch sensor devices for "dragging". In general, "dragging" comprises continued selection, optionally with motion. For example, dragging occurs when an icon is selected and moved using a mouse. Another example is when a portion of text is selected and highlighted. A third example is when a scrollbar thumb on a scrollbar is selected and moved to scroll through text. In all three examples, dragging is accomplished with continued selection (e.g., pressing a button) combined with motion (e.g., cursor motion). Continued selection with zero motion, often referred to as a "press gesture," may be viewed either as a special case of the drag gesture or as a distinct gesture With a mouse, dragging is simple: One moves the cursor to a start point, presses and holds a mouse button, then moves the cursor to an end point—optionally "rowing" (lifting the mouse when it reaches the edge of the mouse pad and setting it back down away from the edge) to drag for long distances—then releases the mouse button to stop dragging. With a traditional touch sensor device, dragging is much more awkward, particularly for dragging long distances. Dragging for long distances is typically more awkward on touch sensor devices because it can require "rowing", e.g., lifting the finger when the edge of the touch sensor is reached to reposition the finger on the touch sensor. Specifically, while some previous techniques have facilitated the use of two fingers to initiate dragging, dragging ends when both the fingers are removed and they have failed to provide any mechanism for maintaining dragging selection without cursor movement. Thus, in these and other systems maintaining dragging with a touch sensor device requires simultaneously pressing another input device (e.g., button) while moving the cursor with the touch sensor device. Pressing a button while moving the cursor using the touch sensor device can be difficult for some users.

The motion in a dragging action often consists of a straight line from a start point to an end point, but some uses of dragging involve other kinds of motions. An effective dragging gesture for touch sensor devices must accommodate all these usage patterns. Some prior art solutions, such as edge motion, help with simple linear drags but are less helpful with the kinds of drag motions used, for example, when operating a scroll bar.

Some current techniques facilitate touch sensor device dragging without requiring input to other buttons. For example, the current market standard is a gesture called "tap-and-a-half" dragging. To utilize tap-and-a-half dragging, once the user has ensured that the cursor or other indicator is at a desired start point, the user lifts any finger that is on the sensitive surface of the touch sensor device taps once, and quickly places the finger back down on the sensitive surface. This gesture activates dragging. The user then moves the cursor by moving the finger to an end point and then lifts the finger to stop dragging. Typically the same finger is used for the entire dragging motion, but different fingers or objects may be used for different portions of the gesture.

While the use of the basic tap-and-a-half gesture to initiate dragging is an improvement, its efficiency in facilitating dragging over long distances is limited. Again, when dragging for long distances the user can be required to "row", e.g., lift the finger when the edge of the touch sensor is reached to reposition the finger on the touch sensor. When the user lifts the finger to "row" the cursor, the selection will be lost and the drag will end, and typically must be restarted with another tap-and-a-half gesture, greatly complicating the gestures required to perform a long distance drag. Many solutions have been used and proposed to enhance the tap-and-a-half gesture for long distance drags. For example, U.S. Pat. No. 5,880,411 discloses locking drags, extended drags, and edge motion. However, all of these solutions, and indeed the tap-and-a-half gesture itself, have the disadvantage that performing them involves distinctly different and complicated hand and finger actions than are used with a mouse, hence making dragging difficult for users familiar with mice.

Thus, while many different techniques have been used to facilitate dragging, there remains a continuing need for improvements in device usability. Particularly, there is a continuing need for improved techniques for facilitating dragging with proximity sensor devices.

BRIEF SUMMARY OF THE INVENTION

The present invention provides a proximity sensor device and method that facilitates improved system usability. Specifically, the proximity sensor device and method provide a user with the ability to easily cause different results in an electronic system using a proximity sensor device as a user interface. For example, it can be used to facilitate user interface navigation, such as dragging and scrolling. As another example, it can be used to facilitate value adjustments, such as changing a device parameter. In general, the proximity sensor device is adapted to distinguish between different object combination motions, determine relative temporal relationships between those motions, and generate user interface results responsive to the motions. Specifically, the proximity sensor device is adapted to indicate a first result responsive to detected motion of the first object combination, indicate a second result responsive to detected motion of the second object combination, the second result different from the first result, and indicate a third result responsive to detected motion of the first object combination following the detected motion of the second object combination, the third result different from first result and the second result. This allows a user to selectively generate different results using the motion of two different object combinations.

In one specific embodiment, the proximity sensor device is implemented to facilitate continued cursor movement with selection, commonly referred to as "dragging" using motion of different object combinations. For example, the proximity sensor device is implemented to indicate selection with cursor movement responsive to detected motion of two adjacent objects across the sensing region, indicate selection without cursor movement responsive to detected motion of one object across the sensing region when the detected motion of one object across the sensing region followed the detected motion of two adjacent objects across the sensing region without an intervening termination event, and indicate further selection with cursor movement responsive to detected motion of two adjacent objects across the sensing region when the detected motion of two adjacent objects across the sensing region followed the detected motion of one object across the sensing region that followed the detected motion of the adjacent objects across the sensing region. This facilitates use of the proximity sensor device by a user to indicate results such as extended dragging, and is particularly useful for indicating continuing adjustments, for example, to facilitate dragging an object over a large distance or scrolling through a large document. This allows a user to continue to drag an object without requiring the user to perform more complex gestures on the proximity sensor device or activate extra control buttons.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides a proximity sensor device and method that facilitates improved system usability. Specifically, the proximity sensor device and method provide a user with the ability to easily cause different results in an electronic system using a proximity sensor device as a user interface. For example, it can be used to facilitate user interface navigation, such as dragging and scrolling.

To cause selective results the proximity sensor device is adapted to distinguish between different object combination motions, determine relative temporal relationships between those motions, and generate user interface results responsive to the motions. Specifically, the proximity sensor device is adapted to indicate a first result responsive to detected motion of the first object combination, indicate a second result responsive to detected motion of the second object combination, the second result different from the first result, and indicate a third result responsive to detected motion of the first object combination following the detected motion of the second object combination, the third result different from first result and the second result. This allows a user to selectively generate different results using the motion of two different object combinations.

Figure 1:
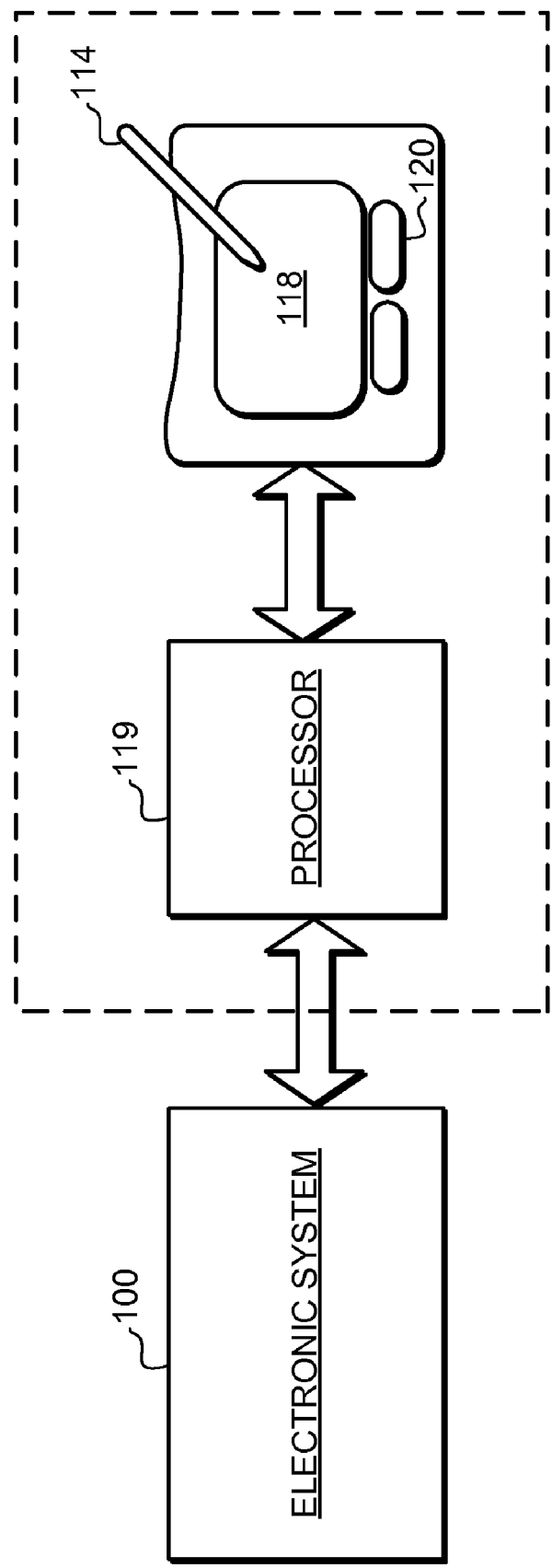
FIG. 1 is a block diagram of an exemplary system that includes a proximity sensor device in accordance with an embodiment of the invention.

Turning now to the drawing figures, FIG. 1 is a block diagram of an exemplary electronic system 100 that is coupled to a proximity sensor device 116. Electronic system 100 is meant to represent any type of personal computer, portable computer, workstation, personal digital assistant, video game player, communication device (including wireless phones and messaging devices), media device, including recorders and players (including televisions, cable boxes, music players, and video players) or other device capable of accepting input from a user and of processing information. Accordingly, the various embodiments of system 100 may include any type of processor, memory or display. Additionally, the elements of system 100 may communicate via a bus, network or other wired or wireless interconnection. The proximity sensor device 116 can be connected to the system 100 through any type of interface or connection, including I2C, SPI, PS/2, Universal Serial Bus (USB), Bluetooth®, RF, IRDA, or any other type of wired or wireless connection to list several non-limiting examples.

Proximity sensor device 116 includes a processor 119 and a sensing region 118. Proximity sensor device 116 is sensitive to the position of a stylus 114, finger and/or other input object within the sensing region 118. "Sensing region" 118 as used herein is intended to broadly encompass any space above, around, in and/or near the proximity sensor device 116 wherein the sensor of the touchpad is able to detect a position of the object. In a conventional embodiment, sensing region 118 extends from the surface of the sensor in one or more directions into space until signal-to-noise ratios prevent object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 116 will vary widely from embodiment to embodiment.

In operation, proximity sensor device 116 suitably detects a position of stylus 114, finger or other input object within sensing region 118, and using processor 119, provides electrical or electronic indicia of the position to the electronic system 100. The system 100 appropriately processes the indicia to accept inputs from the user, to move a cursor or other object on a display, or for any other purpose.

The proximity sensor device 116 can use a variety of techniques for detecting the presence of an object. As several non-limiting examples, the proximity sensor device 116 can use capacitive, resistive, inductive, surface acoustic wave, or optical techniques. In a common capacitive implementation of a touch sensor device a voltage is typically applied to create an electric field across a sensing surface. A capacitive proximity sensor device 116 would then detect the position of an object by detecting changes in capacitance caused by the changes in the electric field due to the object. Likewise, in a common resistive implementation a flexible top layer and a bottom layer are separated by insulating elements, and a voltage gradient is created across the layers. Pressing the flexible top layer creates electrical contact between the top layer and bottom layer. The resistive proximity sensor device 116 would then detect the position of the object by detecting the voltage output due to changes in resistance caused by the contact of the object. In an inductive implementation, the sensor might pick up loop currents induced by a resonating coil or pair of coils, and use some combination of the magnitude, phase and/or frequency to determine distance, orientation or position. In all of these cases the proximity sensor device 116 detects the presence of the object and delivers position information to the system 100. Examples of the type of technologies that can be used to implement the various embodiments of the invention can be found at U.S. Pat. No. 5,543,591, U.S. Pat. No. 6,259,234 and U.S. Pat. No. 5,815,091, each assigned to Synaptics Inc.

Proximity sensor device 116 includes a sensor (not shown) that utilizes any combination of sensing technology to implement one or more sensing regions. For example, the sensor of proximity sensor device 116 can use arrays of capacitive sensor electrodes to support any number of sensing regions. As another example, the sensor can use capacitive sensing technology in combination with resistive sensing technology to support the same sensing region or different sensing regions. Depending on sensing technique used for detecting object motion, the size and shape of the sensing region, the desired performance, the expected operating conditions, and the like, proximity sensor device 116 can be implemented with a variety of different ways. The sensing technology can also vary in the type of information provided, such as to provide "one-dimensional" position information (e.g. along a sensing region) as a scalar, "two-dimensional" position information (e.g. horizontal/vertical axes, angular/radial, or any other axes that span the two dimensions) as a combination of values, and the like.

The processor 119, sometimes referred to as a proximity sensor processor or touch sensor controller, is coupled to the sensor and the electronic system 100. In general, the processor 119 receives electrical signals from the sensor, processes the electrical signals, and communicates with the electronic system. The processor 119 can perform a variety of processes on the signals received from the sensor to implement the proximity sensor device 116. For example, the processor 119 can select or connect individual sensor electrodes, detect presence/proximity, calculate position or motion information, and report a position or motion when a threshold is reached, and/or interpret and wait for a valid tap/stroke/character/button/gesture sequence before reporting it to the electronic system 100, or indicating it to the user. The processor 119 can also determine when certain types or combinations of object motions occur proximate the sensor. For example, the processor 119 can distinguish between motion of a first object combination (e.g., one finger, a relatively small object, etc.) and motion of a second object combination (e.g., two adjacent fingers, a relatively large object, etc.) proximate the sensing region, and can generate the appropriate indication in response to that motion. Additionally, the processor can distinguish the temporal relationship between motions of object combinations. For example, it can determine when motion of the first object combination has followed motion of the second object combination, and provide a different result responsive to the motions and their temporal relationship.

In this specification, the term "processor" is defined to include one or more processing elements that are adapted to perform the recited operations. Thus, the processor 119 can comprise all or part of one or more integrated circuits, firmware code, and/or software code that receive electrical signals from the sensor and communicate with the electronic system 100. In some embodiments, the elements that comprise the processor 119 would be located with or near the sensor. In other embodiments, some elements of the processor 119 would be with the sensor and other elements of the processor 119 would reside on or near the electronic system 100. In this embodiment minimal processing could be performed near the sensor, with the majority of the processing performed on the electronic system 100.

Furthermore, the processor 119 can be physically separate from the part of the electronic system that it communicates with, or the processor 119 can be implemented integrally with that part of the electronic system. For example, the processor 119 can reside at least partially on a processor performing other functions for the electronic system aside from implementing the proximity sensor device 116.

Again, as the term is used in this application, the term "electronic system" broadly refers to any type of device that communicates with proximity sensor device 116. The electronic system 100 could thus comprise any type of device or devices in which a touch sensor device can be implemented in or coupled to. The proximity sensor device could be implemented as part of the electronic system 100, or coupled to the electronic system using any suitable technique. As non-limiting examples the electronic system 100 could thus comprise any type of computing device, media player, communication device, or another input device (such as another touch sensor device or keypad). In some cases the electronic system 100 is itself a peripheral to a larger system. For example, the electronic system 100 could be a data input or output device, such as a remote control or display device, that communicates with a computer or media system (e.g., remote control for television) using a suitable wired or wireless technique. It should also be noted that the various elements (processor, memory, etc.) of the electronic system 100 could be implemented as part of an overall system, as part of the touch sensor device, or as a combination thereof. Additionally, the electronic system 100 could be a host or a slave to the proximity sensor device 116.

In the illustrated embodiment the proximity sensor device 116 is implemented with buttons 120. The buttons 120 can be implemented to provide additional input functionality to the proximity sensor device 116. For example, the buttons 120 can be used to facilitate selection of items using the proximity sensor device 116. Of course, this is just one example of how additional input functionality can be added to the proximity sensor device 116, and in other implementations the proximity sensor device 116 could include alternate or additional input devices, such as physical or virtual switches, or additional proximity sensing regions. Conversely, the proximity sensor device 116 can be implemented with no additional input devices.

It should be noted that although the various embodiments described herein are referred to as "proximity sensor devices", "touch sensor devices", "proximity sensors", or "touch pads", these terms as used herein are intended to encompass not only conventional proximity sensor devices, but also a broad range of equivalent devices that are capable of detecting the position of a one or more fingers, pointers, styli and/or other objects. Such devices may include, without limitation, touch screens, touch pads, touch tablets, biometric authentication devices, handwriting or character recognition devices, and the like. Similarly, the terms "position" or "object position" as used herein are intended to broadly encompass absolute and relative positional information, and also other types of spatial-domain information such as velocity, acceleration, and the like, including measurement of motion in one or more directions. Various forms of positional information may also include time history components, as in the case of gesture recognition and the like. Accordingly, proximity sensor devices can appropriately detect more than the mere presence or absence of an object and may encompass a broad range of equivalents.

In the embodiments of the present invention, the proximity sensor device 116 is adapted to provide the ability for a user to easily cause different results in an electronic system using a proximity sensor device 116 as part of a user interface. For example, it can be used to facilitate user interface navigation, such as cursor control, dragging and scrolling. As another example, it can be used to facilitate value adjustments, such as changing a device parameter. To cause selective results the proximity sensor device 116 is adapted to distinguish between different object combination motions, determine relative temporal relationships between those motions, and generate user interface results responsive to the motions. This allows a user to selectively generate different results using the motion of two different object combinations.

In one specific embodiment, the proximity sensor device 116 is implemented to facilitate continued cursor movement with selection, a type of "dragging," using motion of different object combinations. For example, the proximity sensor device 116 can be implemented to indicate selection with cursor movement (e.g., dragging) responsive to detected motion of two adjacent objects across the sensing region, indicate selection without cursor movement responsive to detected motion of one object across the sensing region when the detected motion of one object across the sensing region followed the detected motion of two adjacent objects across the sensing region without an intervening termination event, and indicate further selection with cursor movement responsive to detected motion of two adjacent objects across the sensing region when the detected motion of two adjacent objects across the sensing region followed the detected motion of one object across the sensing region that followed the detected motion of the adjacent objects across the sensing region. This facilitates use of the proximity sensor device 116 by a user to indicate results such as extended dragging over long distances. Thus, the proximity sensor device 116 allows a user to continue to drag an object without requiring the user to perform more complex gestures on the proximity sensor device or activate extra control buttons.

It should also be understood that while the embodiments of the invention are described herein the context of a fully functioning proximity sensor device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of signal bearing media used to carry out the distribution. Examples of signal bearing media include: recordable media such as memory cards, optical and magnetic disks, hard drives.

As described above, in the embodiments of the invention the proximity sensor device is adapted to distinguish between different object combination motions, determine relative temporal relationships between those motions, and generate user interface results responsive to the motions. The different object combinations can be distinguished based on a variety of different parameters, such as object type, object size, object proximity, pressure on the sensing region, and the number of objects proximate the sensing region, to list several non-limiting examples.

Figure 4:
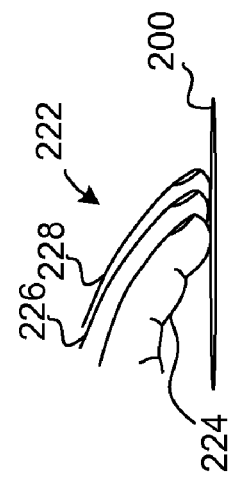
FIGS. 2-4 are side views of exemplary object combinations in the sensing area of a proximity sensor device in accordance with embodiments of the invention.
Figure 3:
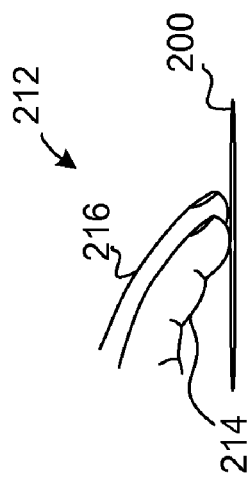
Figure 2:
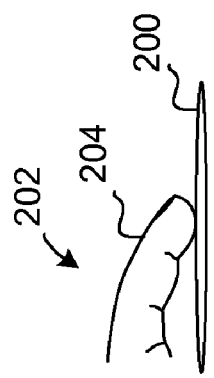

As one specific example, the proximity sensor device is adapted to distinguish the number of objects proximate sensing region. Turning now to FIGS. 2-4, side views of exemplary object combinations are illustrated. Specifically, FIGS. 2-4 illustrate an embodiment where the proximity sensor device is adapted to distinguish between the number of fingers or other objects proximate the sensing region. In FIG. 2, the first object combination 202 comprises one finger 204 proximate the sensing region 200. In FIG. 3, a second object combination 212 comprises two fingers 214 and 216 proximate the sensing region 200. Finally, in FIG. 4, the third object combination 222 comprises three fingers 224, 226 and 228. In this embodiment, the object position detector detects the position of the fingers proximate the sensing region, and determines the number of fingers present. Thus, the object position detector can determine if one, two or more fingers are proximate the touch sensor and generate a result responsive to the number of fingers and the motions of the fingers. Of course, the system could also be adapted to distinguish between any other quantities of objects, such as between three and four fingers, etc. It should be noted that such a system allows the user to easily change the object combination presented to the proximity sensor by selectively placing and lifting any combination of different fingers on the sensing area.

The number of proximate objects is just one example of the type of parameter that can serve as a basis for distinguishing between object combinations. In another embodiment the proximity sensor device is adapted to distinguish object combinations based on size. In this embodiment, the proximity sensor device could determine the size (e.g., area of contact) of an object combination and distinguish based on whether a detected object combination is large object (e.g., above a threshold size, or within a large size range) or a small object (e.g., below a threshold size, or within a small size range). Such an implementation can be used to distinguish between a finger and a relatively smaller stylus, as one example.

As another embodiment, the proximity sensor device is adapted to distinguish based on the pressure applied with the object combinations. For example, by determining if the pressure applied in the sensing region is in a first range of a second range. As another embodiment, the proximity sensor device is adapted to distinguish based on a shape of detected object combination. For example, the proximity sensor device can distinguish between a rounded shape and a rectangular shape.

As another example, the proximity sensor device is adapted to distinguish between parts or positions of proximate objects. For example, the proximity sensor device can be adapted to distinguish between the finger tip being on the sensing region and the finger rolled up with a finger nail on the sensing region. In this embodiment, the proximity sensor device would typically determine the size and/or shape of the detected object. In some cases the recent history of the detected objects may be used to help distinguish the size and/or shape of the detected object combination and thus to determine if the finger tip or finger nail is on the sensing region.

As a further variation on these embodiments, the proximity sensor device can be adapted to determine the proximity of objects in distinguishing between object combinations. For example, the proximity sensor device can determine if two objects are within a specified proximity (e.g., substantially adjacent) and distinguish the object combinations based on the number and/or proximity.

Figure 5:
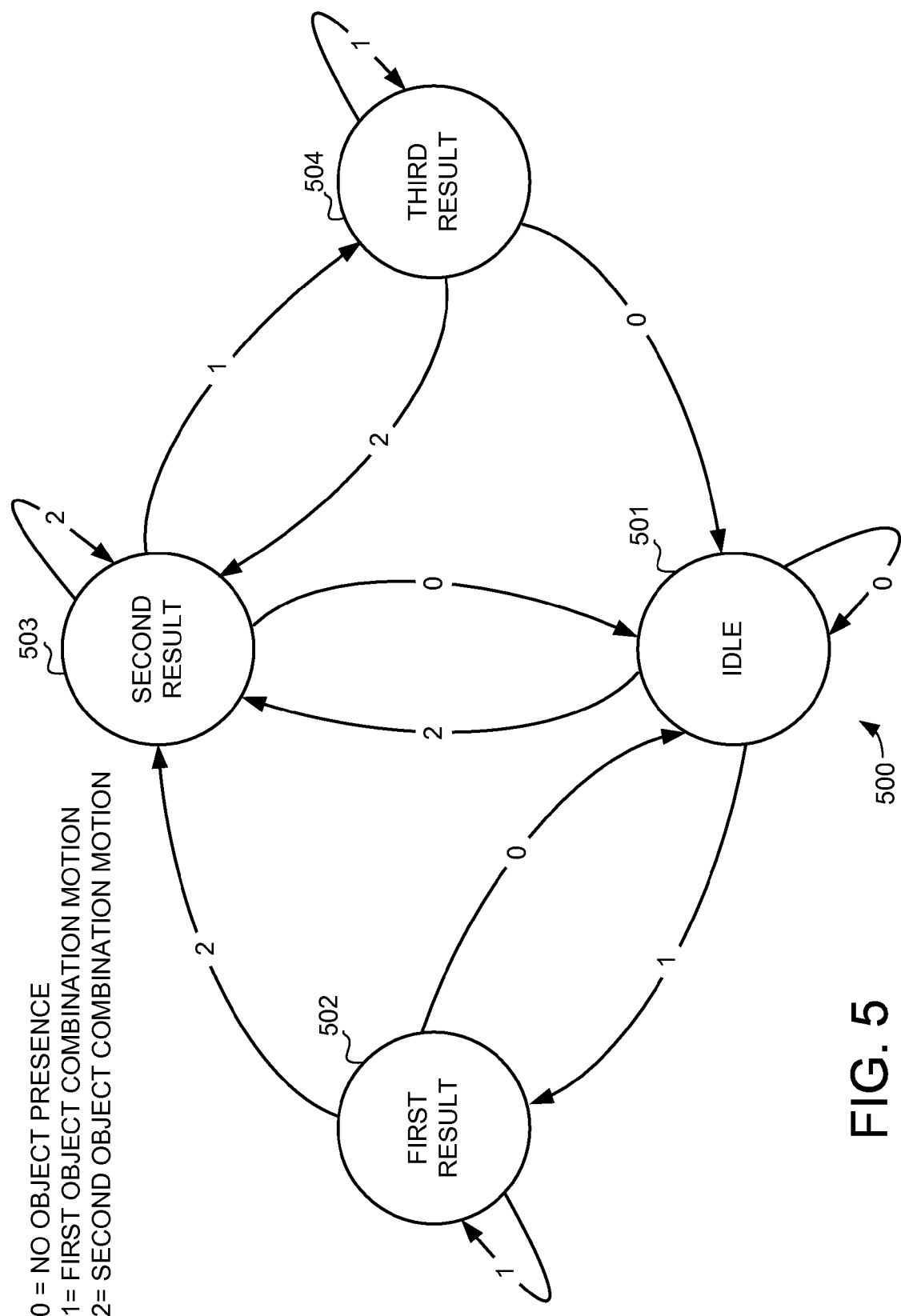
FIG. 5 is a state diagram of a proximity sensor device process in accordance with embodiments of the invention.

In all of these cases, the proximity sensor device is adapted to distinguish between the motions of different object combinations and indicate specific results responsive to the detected object combinations. Turning now to FIG. 5, a state diagram 500 is illustrated schematically. The state diagram 500 illustrates an implementation of a proximity sensor device adapted to distinguish between different object combination motions, determine relative temporal relationships between those motions, and generate user interface results responsive to the motions. As such, the state diagram 500 can be implemented as part of a proximity sensor program, or as part of complete proximity sensor device. The state diagram 500 includes four states, an IDLE state 501, a FIRST RESULT state 502, a SECOND RESULT state 503, and a THIRD RESULT state 504. Each of these various states corresponds to a user interface action being performed in response to the various motions. Specifically, when in the FIRST RESULT state 502 a first user interface result is indicated responsive to object motion, when in the SECOND RESULT state 503 a second user interface result is indicated responsive to object motion, and when in the THIRD RESULT state 504, a third user interface result is indicated responsive to object motion. The IDLE state 501 provides an idle result.

These indicated results can be any type of user interface action or adjustment. For example, the first result can comprise cursor movement without selection, the second result can comprise selection with cursor movement, and third result can comprise selection without cursor movement (e.g., with cursor movement inhibited). In such an implementation, the first result is providing "pointing", the second result is providing "dragging", the third result is providing continued selection without cursor motion, and the idle result occurring after a termination event. As will be described in greater detail below, such an implementation can be used to facilitate extended dragging without requiring complex gestures or the activation of extra control buttons.

Of course, these are just some examples of the type of results that can be indicated when in the various states. Other results include various user interface navigation results, such as horizontal and vertical scrolling, selecting among menu options, stepping through a list, etc In general, scrolling is defined as causing a display window to move its viewing region within a larger space of data. For example, to move within a large document to display a different portion of the document. Scrolling also can include moving a selection point within a list, menu, or other set of data.

Other types of results that could be implemented are value adjustments. In a value adjustment the proximity sensor device is used to change a value on the system. For example, by increasing or decreasing the quantity of a selected field on the device. As some examples, the value adjustment can relate to a functional parameter, such as increasing volume or contrast or aiming a camera to the right.

Transitions between states are determined by detected object combination motion. For example, when in the IDLE state 501, detected first object combination motion (1) causes a transition to the FIRST RESULT state 502. Conversely, when in the IDLE state 501, detected second object combination motion (2) causes a transition to the SECOND RESULT state 503. When in the IDLE state 501, the detection of no object presence (0) causes the process to stay in the IDLE state 501.

As a second example, when in the FIRST RESULT state 502, detected second object combination motion (2) causes a transition to the SECOND RESULT state 503. Conversely, when in the FIRST RESULT state 502, the detection of no object presence (0) causes a transition to the IDLE state 501. Finally, when in the FIRST RESULT state 502, the detection of first object combination motion (1) causes the process to stay in the FIRST RESULT state 502.

It should be emphasized that the process illustrated in state diagram 500 can result in two different results responsive to the first object combination motion (1). Specifically, when in the FIRST RESULT state 502, first object combination motion (1) causes the first result. Conversely, when in the THIRD RESULT state 504, first object combination motion (1) causes the third result. This difference in result is determined in part by the relative temporal relationships between those motions. Specifically, if the first object combination motion (1) is following a termination event (i.e., removing the objects from the sensing region) the process transitions to the FIRST RESULT state 502 and the first result is indicated. If instead, the first object combination motion (1) is following a second result (i.e., SECOND RESULT state 503 without an intervening termination event) the process transitions to the THIRD RESULT state 504 and the third result is indicated.

However, if in the SECOND RESULT state 503, and no object presence (0) for a period of time is detected, the no object presence (0) causes a transition to the IDLE state 501. Thus, no object presence of a period of time serves as a termination event, causing the next detection of a first object combination motion (1) to instigate a transition to FIRST RESULT state 502 instead of the THIRD RESULT state 504 that would have occurred without the termination event.

The process illustrated state diagram 500 is particularly useful in facilitatin extended user interface results such as extended dragging and continuing adjustments. For example, to facilitate dragging an object over a large distance or scrolling through a large document. As described above, such a use can be providing by implementing the first result to cause cursor motion without selection (e.g., pointing), the second result to cause cursor motion with selection (e.g., dragging), and the third result to cause continued selection without cursor motion. This exemplary embodiment is illustrated in FIGS. 6-13. FIGS. 6, 8, 10 and 12 illustrate motions of object combinations across the sensing region 602 of an object proximity sensor 600, while FIGS. 7, 9, 11 and 13 illustrate the corresponding user interface results that are generated on a program interface 700 responsive to the motions.

Specifically, FIGS. 6, 8, 10, 12 illustrate the motions of a first object combination and a second object combination. In the illustrated embodiments, the detected motion of the first object combination comprises the motion of a one object combination 604 (e.g., one finger) across the sensing region 602, with the one object combination 604 illustrated as a single oval. Likewise, the detected motion of the second object combination comprises motion of a two object combination 606 (e.g., two adjacent fingers), illustrated as a set of two adjacent ovals. FIGS. 7, 9, 11 and 13 likewise illustrate the corresponding results on the program interface 700, with program interface including a cursor 702 and an icon 704.

Figure 7:
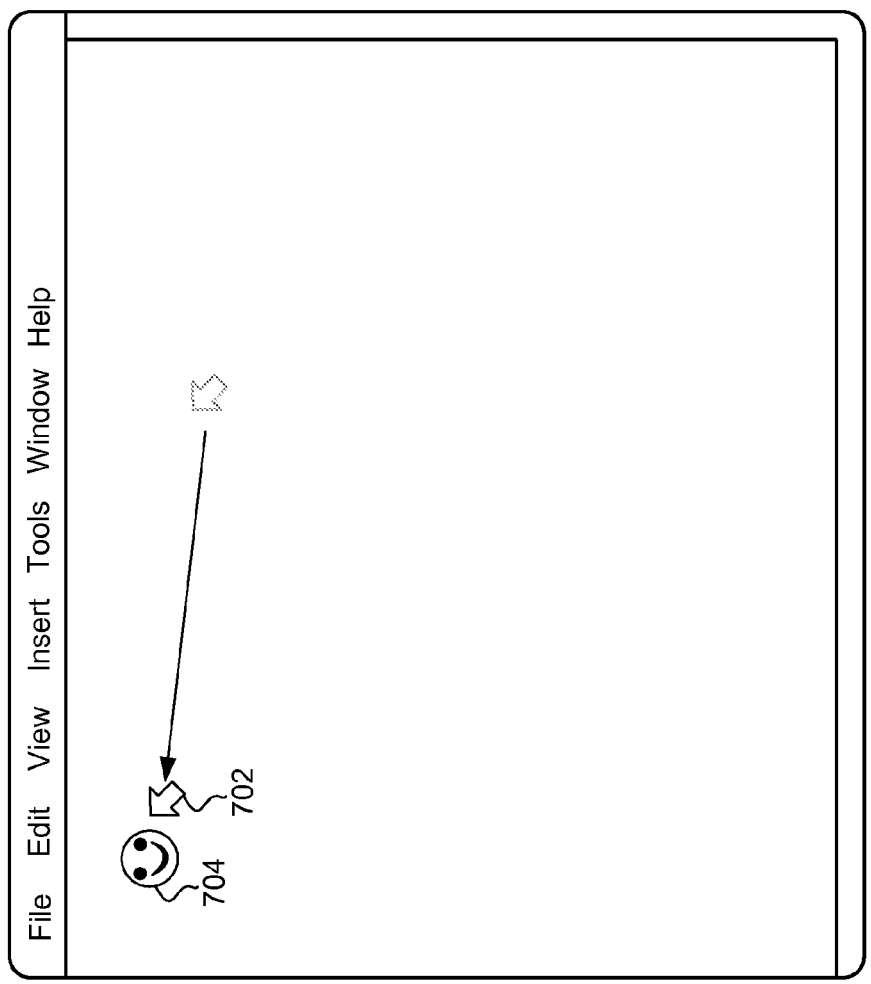
FIGS. 7, 9, 11 and 13 are schematic views results on a program interface in accordance with embodiments of the invention.
Figure 6:
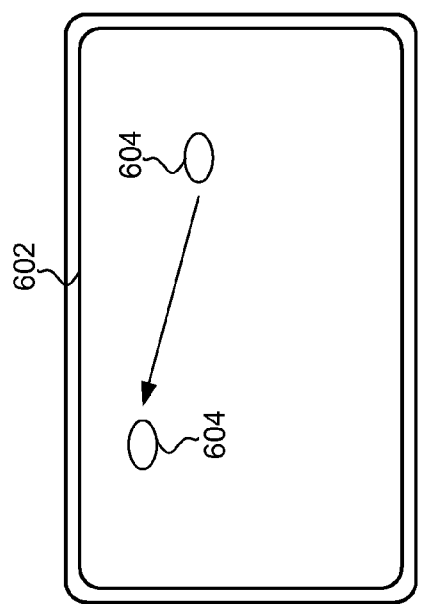
FIGS. 6, 8, 10 and 12 are schematic views of a proximity sensor device with object combination motions in accordance with embodiments of the invention.

The system illustrated in FIGS. 5-13 operates as follows. After a period of inactivity, the proximity sensor device 600 would be in the IDLE state 501. When a user causes motion of a one object combination 604 (e.g., the first object combination), the process transitions to the FIRST RESULT state 502, and a cursor motion (a first result) is generated in response to the motion of the single object. This is illustrated in FIGS. 6 and 7, where the motion of the one object combination 604 across the sensing region 602 causes the cursor 702 to move across the program interface 700 and towards the icon 704.

Figure 9:
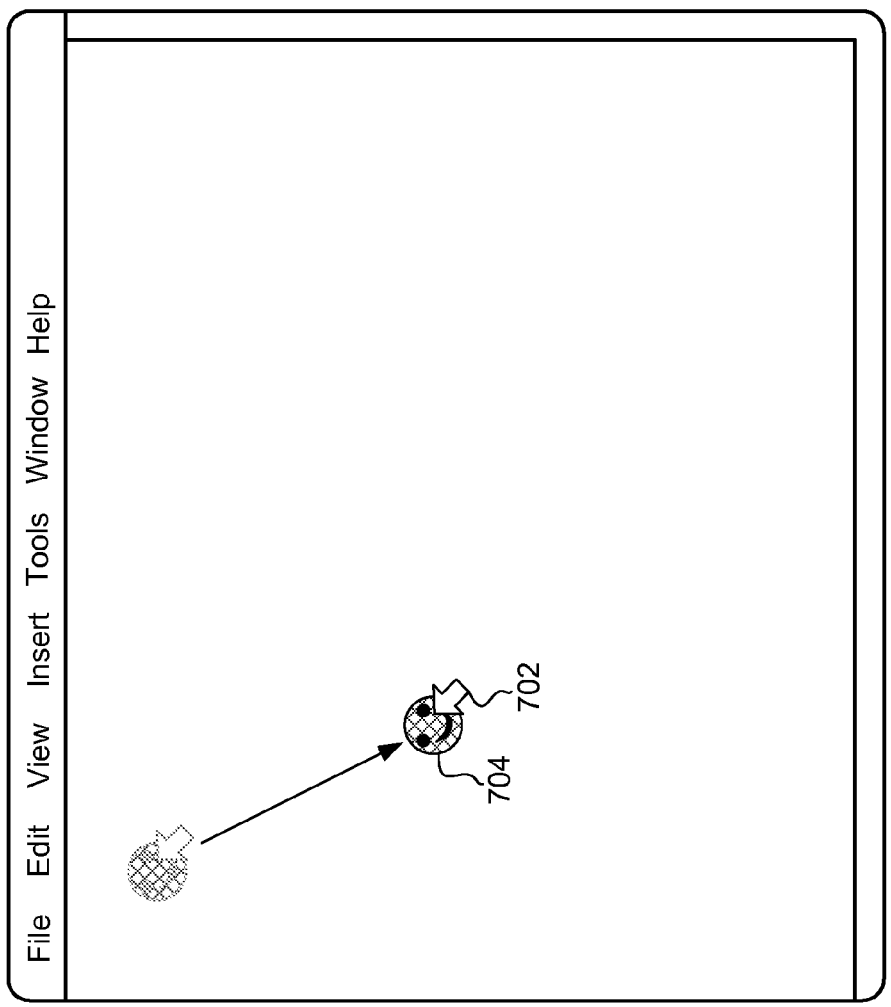
Figure 8:
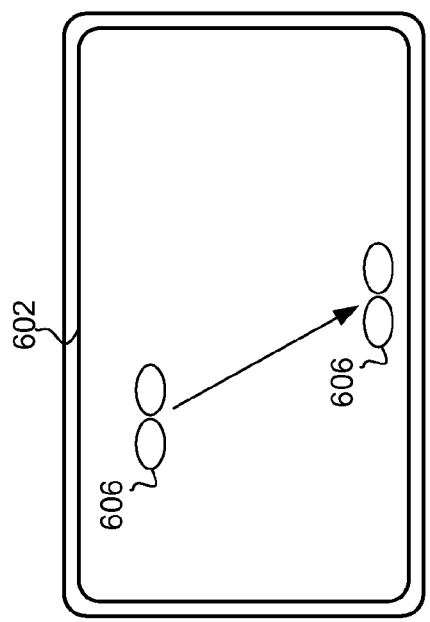

Upon moving the cursor 702 to the icon 704, the user can select the icon 704 and commence dragging the icon 704 by placing a second object (e.g., a second finger) on the sensing region 602. The resulting detected motion of the two object combination 606 causes the process to transition to the SECOND RESULT state 503, and cursor motion with selection, referred to as "dragging" (a second result) is generated in response to the motion of the two object combination 606. This is illustrated in FIGS. 8 and 9, where the motion of the two object combination 606 across the sensing region 602 causes the cursor 702 and the selected icon 704 to be dragged across the program interface 700. This process continues until the object motion across the sensing region 602 is stopped (e.g., because the object motion has reached the edge of the sensing region 602 or simply by user choice).

Figure 11:
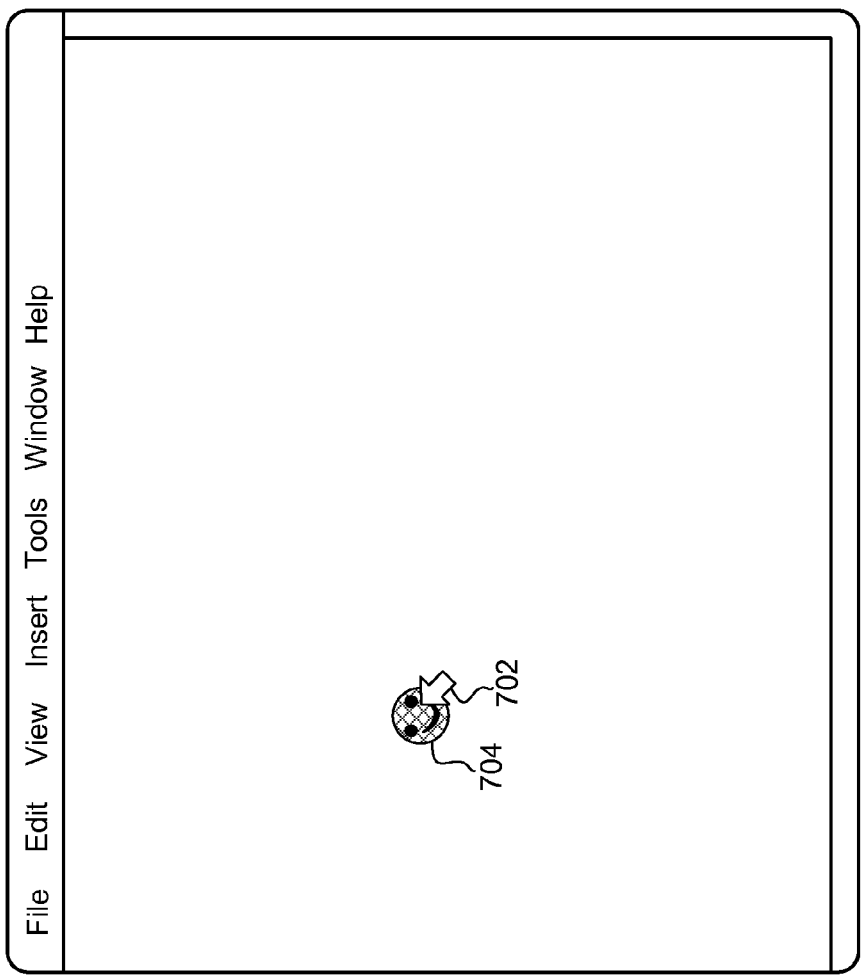
Figure 10:
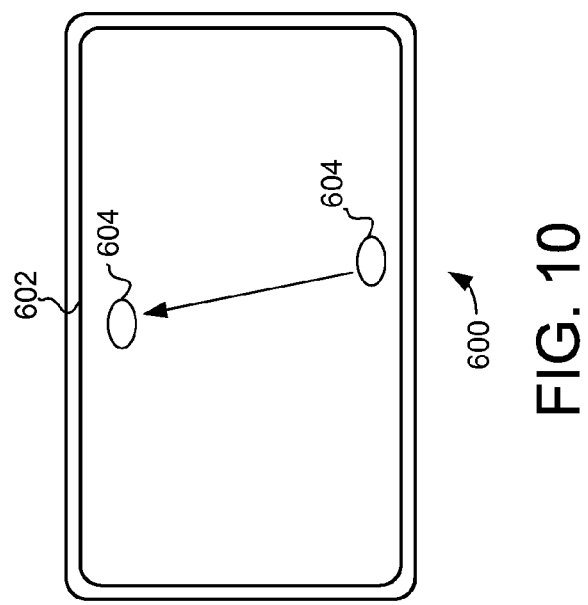

When continued dragging is desired, the user can reposition the objects on the sensing region 602 without losing selection of the icon 704. Specifically, the user can remove one object from the sensing region 602, and move the remaining one object combination 604 back across the sensing region 602. This allows the user to reposition the objects without losing selection. Specifically, the detected motion of the one object combination 604 causes the process to transition to the THIRD RESULT state 504, and continued selection without cursor motion (a third result) is generated in response to the motion of the one object combination 604. This is illustrated in FIGS. 10 and 11, where the motion of the one object combination 604 across the sensing region 602 allows object repositioning while the icon 704 remains selected without causing cursor motion. This process continues until the user reaches the desired location on the sensing region.

Figure 13:
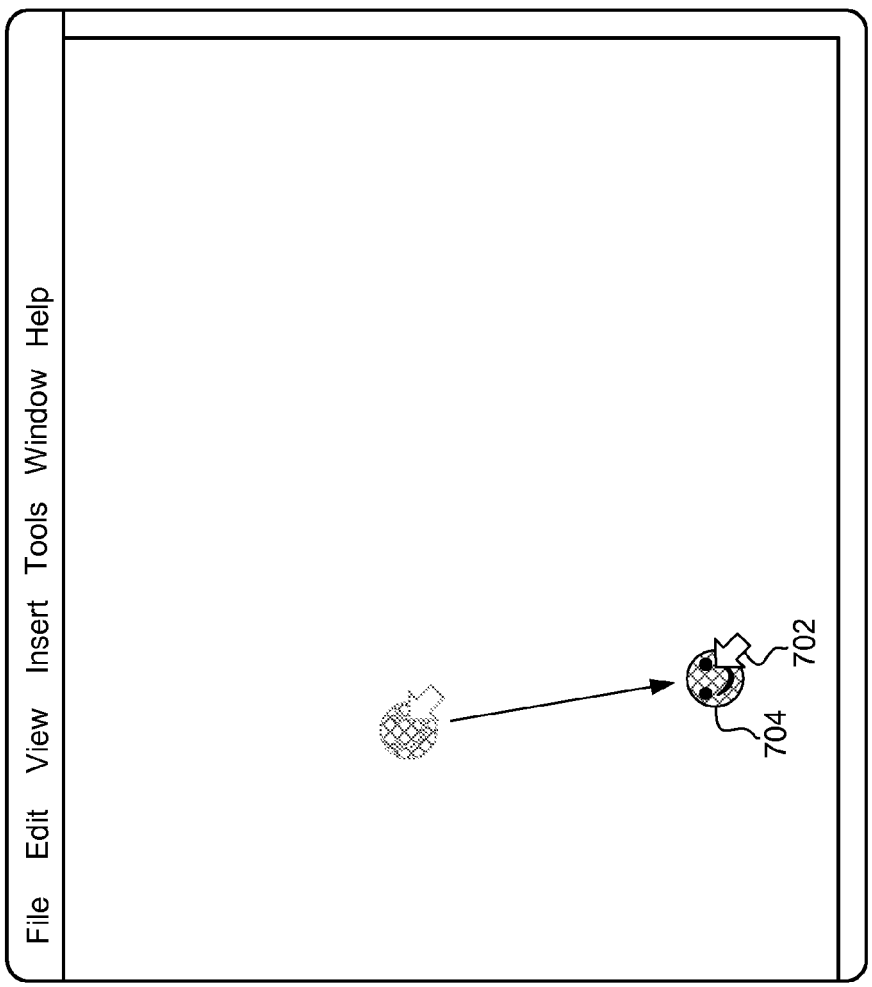
Figure 12:
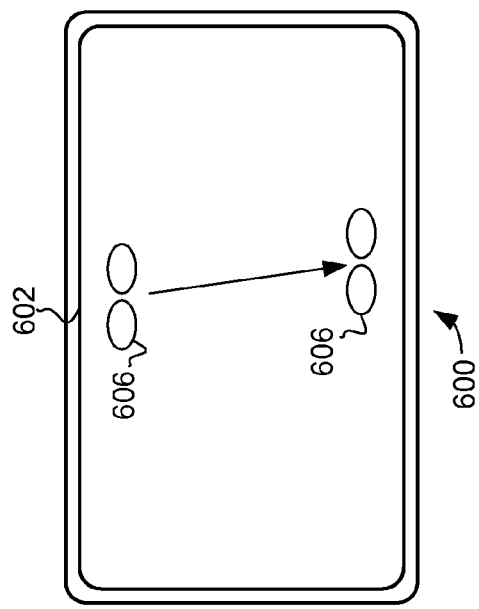

When the user reaches the desired object location and intends to continue dragging with cursor motion, the user can return the second object to the sensing region 602 and again moves the two object combination 606 across the sensing region. The detected motion of the two object combination 606 causes the process to again transition to the SECOND RESULT state 503, and dragging is continued in response to the motion of the two object combination 606. This is illustrated in FIGS. 12 and 13, where the motion of the two object combination 606 across the sensing region 602 again causes the cursor 702 and the selected icon 704 to be dragged across the program interface 700 until the icon 704 reaches the desired location.

This process can be repeated as often as needed by the user. When dragging over a very large distance the process can be repeated many times, all without selection of the icon 704 being lost. However, if the user wishes returns to cursor motion without selection at any time, a termination event can be triggered, causing the process to return to the IDLE state 501. Again, in one embodiment the termination event can be triggered by lifting all objects from the sensing region for a period of time. The detection of no object presence for the period of time causes the process to return to the IDLE state 501, and the next detected motion of one object 604 will again trigger cursor motion, the first result. It should also be emphasized that an actual separate IDLE state 501 is not required, and that process can be implemented by transitioning directly from the SECOND RESULT state 503 to the FIRST RESULT state 502 when a termination event occurs while in the SECOND RESULT state 503, and likewise transitioning directly from the THIRD RESULT state 504 to the FIRST RESULT state 502 when a termination event occurs while in the THIRD RESULT state 504.

This is also just one example of the type of termination event that the proximity sensor device can be adapted to detect. Other potential termination events can include a set timeout after all objects have been lifted from the sensing region, a change in the number of objects, specific gestures such as taps and double taps.

As another example, termination events can include a transition from the two object combination 606 state to the one object combination 604 within a set period of time (e.g. maximum tap time) after the transition from the one object combination 604 to the two object combination 606. In an embodiment incorporating this adaptation, the user who desires to move the cursor continuously while briefly selecting at periodic intervals—to select multiple ungrouped objects, for instance, or to "strafe" in a gaming application—can do so by moving one finger to generate cursor motion while tapping a second finger whenever he wants to briefly select.

To facilitate this embodiment, the process 500 is implemented such that removal of one of the two fingers will cause a transition to the THIRD RESULT state only if the sensor device detects that the second finger was not "tapped" on the surface (e.g., if the duration of the second finger presence is greater than a predetermined maximum tap time). If the sensor device detects that the second finger was tapped, then the removal of one of the two fingers (i.e., the end of the tap) does not cause a transition to the THIRD RESULT state; instead, it is a termination event that causes a transition to the IDLE state, from which the detection of the remaining finger's presence causes an immediate transition to the FIRST RESULT state.

Thus, the proximity sensor device 600 allows a user to continue to drag an object without requiring the user to perform more complex gestures on the proximity sensor device or activate extra control buttons. A user can thus generate results such as extended dragging, for example, to facilitate dragging an object over a large distance or scrolling through a large document.

Several different techniques can be used to improve the usability of proximity sensor devices in accordance with the embodiments of the invention. For example, in some implementations it will be desirable to not indicate results responsive to signals representing very small or sudden amounts of sensed object combination presence or motion. Small amounts of sensed object combination presence and motion can inadvertently result from attempts by the user to pause in the sensing region. In these cases small amounts of presence or motion caused by bodily tremors or shaking in the environment could be interpreted as intended object motion. In addition, a user may reduce or stop paying attention to object motion while examining items on the list, and accidentally drift the object motion. Further, there may also be accidental input from the user accidentally brushing against the sensing region (these are likely to result in sudden amounts of sensed object motion, large or small). Likewise, electronic noise from sources such as power supply(s), EMI, etc. can cause spurious, incorrect signals hinting at object motion that do not exist. In all these cases it can be desirable to not indicate results responsive to these signals indicating small or sudden amounts of sensed object motion to avoid causing inadvertent adjustment when no such adjustment is intended by the user.

One way to address this issue is with the use of filters, such as with the use of threshold values and by gauging if the object motion is beyond one or more threshold levels. Thresholds may be maximum or minimum bounds, such that object motion may be "beyond" a maximum threshold when it is above the threshold level and "beyond" a minimum threshold when it is below the threshold level. For example, by comparing the sensed object combination motion to a threshold, the system can ignore sensed levels of object motion that are below the threshold and not indicate results. In this case, the threshold can be set to filter out object motion less than what is likely to be indicative of intended input, and the proximity sensor device will not consider amounts of sensed object motion below that threshold to be indicative of object combination motion. Alternatively, the system can ignore sensed levels of object motion that are above a threshold and not indicate results. In this alternate case, the threshold can be set to filter out object combination motion greater than what is likely to be indicative of intended input, and the proximity sensor device will not consider amounts of sensed object motion above the threshold to be indicative of object motion. A variety of thresholds can be used, separately or in combination. For example, the system can require that the object motion travel a minimum distance proximate/in the sensing region before responding with results, but accept object motion traveling less than that minimum distance threshold as other input. It should be noted that while object motion below the distance threshold would not generate any indications of results, it could still be used to trigger other input (e.g. selection). Further constraints can be imposed, such as to require that a minimum distance or a maximum distance be traveled within a predetermined amount of time. The threshold may also alternatively be on another characteristic of the object motion, such as requiring that the speed of the object motion be beyond a certain threshold and/or below a particular threshold before generating an indication of a result. Thresholds may also be combined, such that an object motion must travel a minimum distance, within a certain amount of time, and reach at least a minimum speed, before indications of results will be provided. Another combination of thresholds can require that an object motion must travel no more than a maximum distance, within a certain amount of time, and not pass a maximum speed, such that the system will begin or continue indications of results.

The exact values of these thresholds vary with a myriad of factors, such as details of the sensing technology, user interface design, and operating conditions. The threshold values may also differ with directions/manners of results, which result is selected, and user preferences. To accommodate this, the threshold values can be made adjustable, such as to change the value in response to determined noisiness of the environment, prior history of typical user input speeds and distances, which result is currently selected, which direction/manner of adjustment is current active, user definition, or the like.

The various embodiments of the invention thus provide a proximity sensor device and method that facilitates improved system usability. Specifically, the proximity sensor device and method provide a user with the ability to easily cause different results in an electronic system using a proximity sensor device as a user interface.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A proximity sensor device, the proximity sensor device comprising:
a sensor, the sensor adapted to detect object motion proximate a sensing region; and
a processor, the processor coupled to the sensor, the processor adapted to:
distinguish between detected motion of a first object combination and detected motion of a second object combination;
indicate cursor movement without selection responsive to detected motion of the first object combination;
indicate selection with cursor movement responsive to detected motion of the second object combination; and
indicate selection without cursor movement responsive to detected motion of the first object combination following the detected motion of the second object combination.

2. The proximity sensor device of claim 1 wherein the first object combination comprises a first number of objects proximate the sensing region, and wherein the second object combination comprises a second number of objects proximate the sensing region, the second number of objects different from the first number of objects.

3. The proximity sensor device of claim 2 wherein the first number of objects is less than the second number of objects.

4. The proximity sensor device of claim 1 wherein the first object combination comprises one object proximate the sensing region, and wherein the second object combination comprises two objects proximate the sensing region.

5. The proximity sensor device of claim 1 wherein the first object combination comprises object pressure applied in the sensing region in a first pressure range and wherein the second object combination comprises object pressure applied in the sensing region in a second pressure range different from the first pressure range.

6. The proximity sensor device of claim 1 wherein the first object combination has a first size range proximate the sensing region, and wherein the second object combination has a second size range proximate the sensing region, the first size range different from the second size range.

7. The proximity sensor device of claim 1 wherein the processor is further adapted to determine if a termination event occurred, and wherein the processor is adapted to indicate cursor movement without selection responsive to the detected motion of the first object combination if the termination event occurred.

8. The proximity sensor device of claim 7 wherein the termination event comprises an intervening period without detected presence after the detected motion of the second object combination.

9. The proximity sensor device of claim 7 wherein the processor transitions to an idle state in response to the termination event, and wherein the processor is adapted to indicate cursor movement without selection responsive to the detected motion of the first object combination after the idle state.

10. A proximity sensor device, the proximity sensor device comprising:
- a sensor, the sensor adapted to detect motion across a sensing region; and
- a processor coupled to the sensor, the processor configured to:
  - distinguish between detected motion of one object across the sensing region and detected motion of two adjacent objects across the sensing region;
  - indicate selection with cursor movement responsive to detected motion of two adjacent objects across the sensing region;
  - indicate selection without cursor movement responsive to detected motion of one object across the sensing region when the detected motion of one object across the sensing region followed the detected motion of two adjacent objects across the sensing region without an intervening termination event; and
  - indicate further selection with cursor movement responsive to detected motion of two adjacent objects across the sensing region when the detected motion of two adjacent objects across the sensing region followed the detected motion of one object across the sensing region that followed the detected motion of the adjacent objects across the sensing region; and
  - indicate cursor movement without selection responsive to detected motion of one object across the sensing region unless the detected motion of one object across the sensing region followed the detected motion of two adjacent objects across the sensing region without an intervening termination event.

11. The proximity sensor device of claim 10 wherein the processor is further adapted to determine if the intervening termination event occurred, and wherein the intervening termination event comprises a lack of detected presence for a first time period.

12. A method of indicating user interface results from a sensor adapted to detect object motion proximate a sensing region, the method comprising:
- indicating cursor movement without selection responsive to detected motion of a first object combination;
- indicating selection with cursor movement responsive to detected motion of a second object combination; and
- indicating selection without cursor movement responsive to detected motion of the first object combination following the detected object presence of the second object combination.

13. The method of claim 12 wherein the first object combination comprises a first number of objects proximate the sensing region, and wherein the second object combination comprises a second number of objects proximate the sensing region, the second number of objects different from the first number of objects.

14. The method of claim 13 wherein the first number of objects is less than the second number of objects.

15. The method of claim 12 wherein the first object combination comprises a first portion of an object proximate the sensing region, and wherein the second object combination comprises a second portion of the object proximate the sensing region.

16. The method of claim 12 wherein the first object combination comprises object pressure applied in the sensing region in a first pressure range and wherein the second object combination comprises object pressure applied in the sensing region in a second pressure range different from the first pressure range.

17. The method of claim 12 wherein the first object combination has a first size range proximate the sensing region, and wherein the second object combination has a second size range proximate the sensing region, the first size range different from the second size range.

18. The method of claim 12 further comprising the step of determining if a termination event occurred, and further comprising the step of indicating cursor movement without selection responsive to the detected motion of the first object combination following the termination event if the termination event occurred.

19. The method of claim 18 wherein the intervening termination event comprises an intervening period without detected presence after the detected motion of the second object combination.

20. The method of claim 12 wherein:
- the step of indicating cursor movement without selection responsive to detected motion of a first object combination comprises indicating cursor movement without selection responsive to detected motion of one object across the sensing region;
- the step of indicating selection with cursor movement responsive to detected motion of a second object combination comprises indicating selection with cursor movement responsive to detected motion of two adjacent objects across the sensing region; and
- the step of indicating selection without cursor movement responsive to detected motion of the first object combination following the detected motion of the second object combination comprises indicating selection without cursor movement responsive to detected motion of one object across the sensing region when the detected motion of one object across the sensing region follows the detected motion of two objects without an intervening termination event.

21. The method of claim 20 further comprising the step of determining if the intervening termination event occurred, and wherein the intervening termination event comprises a lack of detected presence in the sensing region for a first time period.

22. A program product comprising:
a) a proximity sensor program, the proximity sensor program adapted to detect object motion proximate a sensing region in a proximity sensor device, the proximity sensor device further adapted to distinguish between detected motion of a first object combination and detected motion of a second object combination; indicate cursor movement without selection responsive to detected motion of the first object combination; indicate selection with cursor movement responsive to detected motion of the second object combination; and indicate selection without cursor movement to detected motion of the first object combination following the detected motion of the second object combination; and
b) non-transitory computer-readable media bearing said proximity sensor program.

* * * * *